(12) United States Patent
Becke et al.

(10) Patent No.: US 10,890,472 B2
(45) Date of Patent: Jan. 12, 2021

(54) LOW POWER OPERATIONAL METHODOLOGY FOR A FLOW SENSOR

(71) Applicant: Honeywell International Inc., Morris Plains, NJ (US)

(72) Inventors: Craig Scott Becke, South Vienna, OH (US); Lamar Floyd Ricks, Lewis Center, OH (US); Ian Bentley, New Ipswich, NH (US)

(73) Assignee: Honeywell International Inc., Charlotte, NC (US)

( * ) Notice: Subject to any disclaimer, the term of this patent is extended or adjusted under 35 U.S.C. 154(b) by 135 days.

(21) Appl. No.: 15/247,498

(22) Filed: Aug. 25, 2016

(65) Prior Publication Data
US 2018/0058892 A1    Mar. 1, 2018

(51) Int. Cl.
*G01F 1/69*     (2006.01)
*G01F 1/698*    (2006.01)
*G01F 1/692*    (2006.01)

(52) U.S. Cl.
CPC .............. *G01F 1/69* (2013.01); *G01F 1/6986* (2013.01); *G01F 1/692* (2013.01)

(58) Field of Classification Search
CPC . G01F 1/69; G01F 1/692; G01F 1/696; G01F 1/698; G01F 1/6986
See application file for complete search history.

(56) References Cited

U.S. PATENT DOCUMENTS

| | | | |
|---|---|---|---|
| 5,827,960 A | 10/1998 | Sultan et al. | |
| 6,234,016 B1 * | 5/2001 | Bonne | G01F 1/6845 73/204.26 |
| 6,550,324 B1 * | 4/2003 | Mayer | G01F 1/6986 73/204.14 |
| 6,550,325 B1 * | 4/2003 | Inushima | G01F 1/688 338/22 SD |

(Continued)

FOREIGN PATENT DOCUMENTS

| | | |
|---|---|---|
| DE | 3429729 A1 | 7/1986 |
| DE | 19654010 C1 | 7/1998 |

(Continued)

OTHER PUBLICATIONS

EP17186749.2 Extended European Search Report, dated Jan. 30, 2018.

*Primary Examiner* — Justin N Olamit
(74) *Attorney, Agent, or Firm* — Seager Tufte & Wickhem LLP (57) ABSTRACT

In an embodiment, a method of sensing a flow comprises performing a measurement cycle for a first period of time, powering off the at least one upstream resistive element and the at least one downstream resistive element for a second period of time, and performing another measurement cycle for a third period of time. Performing the measurement cycle comprises supplying a current to the upstream resistive element and the downstream resistive element arranged in a bridge, resistively heating the upstream resistive element and the downstream resistive element to a temperature (Continued)

above an ambient temperature, and detecting an imbalance in the bridge resulting from a temperature difference between the at least one upstream resistive element and the at least one downstream resistive element in response to the flow of a fluid past the flow sensor.

20 Claims, 4 Drawing Sheets

(56) References Cited

U.S. PATENT DOCUMENTS

| | | |
|---|---|---|
| 6,626,838 B2 | 9/2003 | Doten et al. |
| 6,690,569 B1 | 2/2004 | Mayer et al. |
| 6,732,581 B1 * | 5/2004 | Torresin ............... A61B 5/0878 |
| | | 73/204.14 |
| 6,744,389 B2 | 6/2004 | Haeberli et al. |
| 6,750,522 B1 | 6/2004 | Mayer et al. |
| 6,763,710 B2 | 7/2004 | Mayer et al. |
| 6,779,395 B2 | 8/2004 | Hornung et al. |
| 6,779,712 B2 | 8/2004 | Kleinlogel et al. |
| 6,813,944 B2 | 11/2004 | Mayer et al. |
| 6,888,358 B2 | 5/2005 | Lechner et al. |
| 6,920,786 B2 | 7/2005 | Mayer et al. |
| 7,154,372 B2 | 12/2006 | Vanha et al. |
| 7,188,519 B2 | 3/2007 | Hornung et al. |
| 7,281,405 B2 | 10/2007 | Mayer et al. |
| 7,490,511 B2 | 2/2009 | Mayer et al. |
| 7,693,647 B2 * | 4/2010 | Suzuki ............... F02D 41/062 |
| | | 123/491 |
| 8,336,376 B2 * | 12/2012 | Nakano ............... G01F 1/6845 |
| | | 73/204.15 |
| 2008/0236273 A1 * | 10/2008 | Dmytriw ............... G01F 1/69 |
| | | 73/204.17 |
| 2013/0125643 A1 * | 5/2013 | Batty ............... G01F 1/692 |
| | | 73/204.14 |
| 2014/0183386 A1 | 7/2014 | Ravid et al. |

FOREIGN PATENT DOCUMENTS

| | | |
|---|---|---|
| DE | 19845462 A1 | 4/2000 |
| EP | 0206215 A1 | 12/1986 |
| WO | 2016044407 A1 | 3/2016 |

* cited by examiner

FIG. 4

LOW POWER OPERATIONAL METHODOLOGY FOR A FLOW SENSOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Flow sensors are used to sense fluid flow, and in some cases, provide flow signals that can be used for instrumentation and/or control. Flow sensors are used in a wide variety of applications including industrial applications, medical applications, engine control applications, military applications, and aeronautical applications, to name just a few.

SUMMARY

In an embodiment, a method of sensing a flow comprises performing a measurement cycle for a first period of time, powering off the at least one upstream resistive element and the at least one downstream resistive element for a second period of time, and performing the measurement cycle for a third period of time. Performing the measurement cycle comprises supplying a current to a flow sensor comprising at least one upstream resistive element and at least one downstream resistive element arranged in a bridge, resistively heating the at least one upstream resistive element and the at least one downstream resistive element to a temperature above an ambient temperature in response to supplying the current to the sensor, and detecting an imbalance in the bridge resulting from a temperature difference between the at least one upstream resistive element and the at least one downstream resistive element in response to the flow of a fluid past the flow sensor. The imbalance is related to a rate of the fluid flow past the flow sensor. No current flows to the at least one upstream resistive element and the at least one downstream resistive element during the second period of time.

In an embodiment, a flow sensor comprises at least one upstream resistive element, at least one downstream resistive element, and control circuitry. The at least one upstream resistive element and the at least one downstream resistive element are arranged in a bridge, and the control circuitry is in signal communication with the bridge. The control circuitry is configured to periodically provide power to the bridge to perform measurement cycles, and power off the bridge between each measurement cycle. During each measurement cycle, the control circuitry is configured to supply a current to the bridge, resistively heat the at least one upstream resistive element and the at least one downstream resistive element to a temperature above an ambient temperature in response to the current, and detect an imbalance in the bridge resulting from a temperature difference between the at least one upstream resistive element and the at least one downstream resistive element in response to a flow of a fluid past the bridge. The imbalance is related to a rate of the fluid flow past the bridge.

In an embodiment, a method of sensing a flow comprises pulsing power to a flow sensor that comprises at least one upstream resistive element and at least one downstream resistive element arranged in a bridge, resistively heating the at least one upstream resistive element and the at least one downstream resistive element to a temperature above an ambient temperature in response to pulsing the power, and detecting an imbalance in the bridge resulting from a temperature difference between the at least one upstream resistive element and the at least one downstream resistive element in response to the flow of a fluid past the flow sensor. The imbalance is related to a rate of the fluid flow past the flow sensor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The disclosure relates generally to methods of operating sensors, and more particularly, to methods of operating flow sensors. In general, resistance-based flow sensors include an upstream resistive sensor element, a downstream resistive sensor element, and an intervening heater resistive element. To help reduce the size and/or cost of such flow sensor, it is contemplated that the heater resistor may be eliminated. When so provided, the space required for the heater resistive element, as well as the corresponding heater control circuit, may be eliminated. This can reduce the cost, size, and complexity of the flow sensor.

In one example, a flow sensor may be provided that has an upstream self-heating sensor element and a downstream self-heating sensor element, with no intervening heater element. In some cases, the upstream resistive element and the downstream resistive element can be operatively connected in a bridge circuit. The bridge circuit may be configured to supply a current to each of the upstream resistive element and the downstream resistive element that causes resistive heating such that both the upstream resistive element and the downstream resistive element are heated above the ambient temperature of the fluid flowing through a flow channel. When fluid flow is present in a flow channel, the fluid flow causes the temperature of the upstream resistive element to be lower than the temperature of the downstream resistive element. The difference in temperature causes an imbalance in the bridge circuit that is related to the flow rate of the fluid flowing though the flow channel.

In order to reduce the power requirements for a flow sensor having resistive based sensor elements without a dedicated heater, an operating mode may be used that is non-continuous. In some embodiments, the resistive elements can be pulsed, followed by a measurement period during which a flow rate indication can be determined. The sense elements can then be powered down to converse power between measurement cycles. Such intermittent sensor readings may allow for accurate measurements while providing a reasonable operating lifetime using a variety of power sources. For example, the flow sensor can be used with battery power while providing an operating period of days, weeks, or months.

Figure 1:
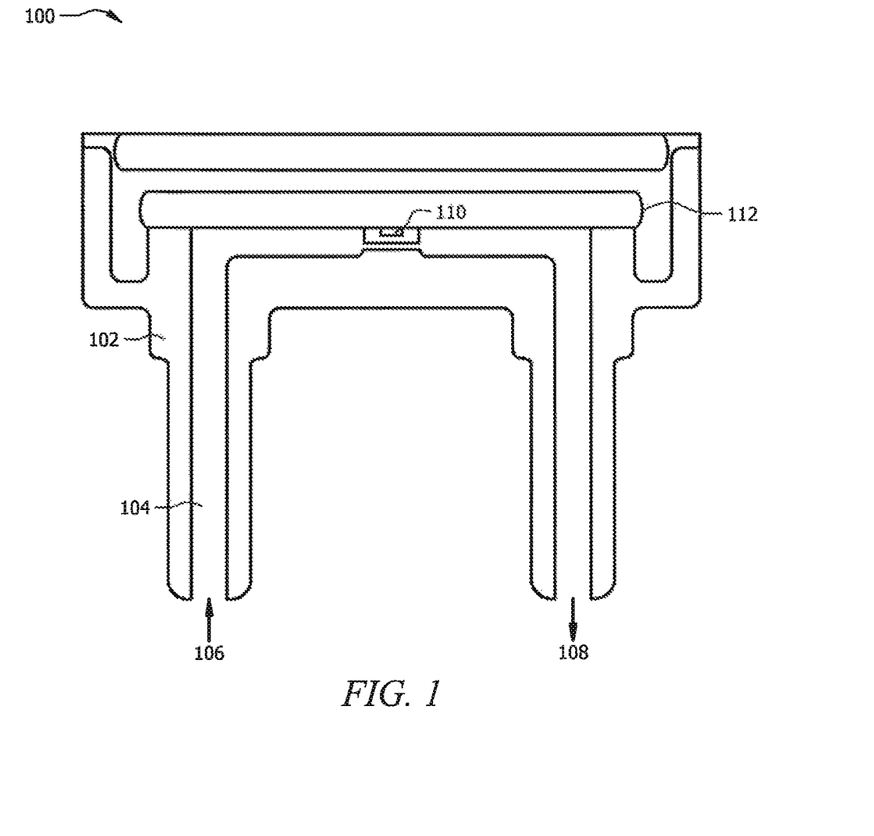
FIG. 1 is a schematic cross-sectional view of an embodiment of a flow sensing device.

FIG. 1 is a schematic cross-sectional view of an example flow sensing device 100. The illustrative flow sensing device 100 includes a flow sensing device body 102 that defines a flow channel 104 having first end 106 and a second end 108. A fluid may flow through the flow channel 104 from, for example, the first end 106 to the second end 108 and past a flow sensor 110. The flow sensor 110 may sense the flow of the fluid passing over the flow sensor 110, and provide one or more output signals indicative of that flow. In some cases, the flow sensor 110 may provide one or more output signals that identify the flow rate of the fluid passing over the flow sensor 110.

While not required, the flow sensor 110 may include a flow sensor die that is mounted to a substrate 112. The substrate 112 may be mounted in the flow sensing device body 102. In some cases, some of the support circuitry for the flow sensor die may be located on the substrate 112 and/or may be located outside of the flow sensing device 100 altogether (e.g. located in a device that uses the output of the flow sensing device 100). FIG. 1 shows one example configuration of a flow sensing device. It should be recognized that such flow sensor devices can and do assume a wide variety of different configurations, depending on the application.

Figure 2:
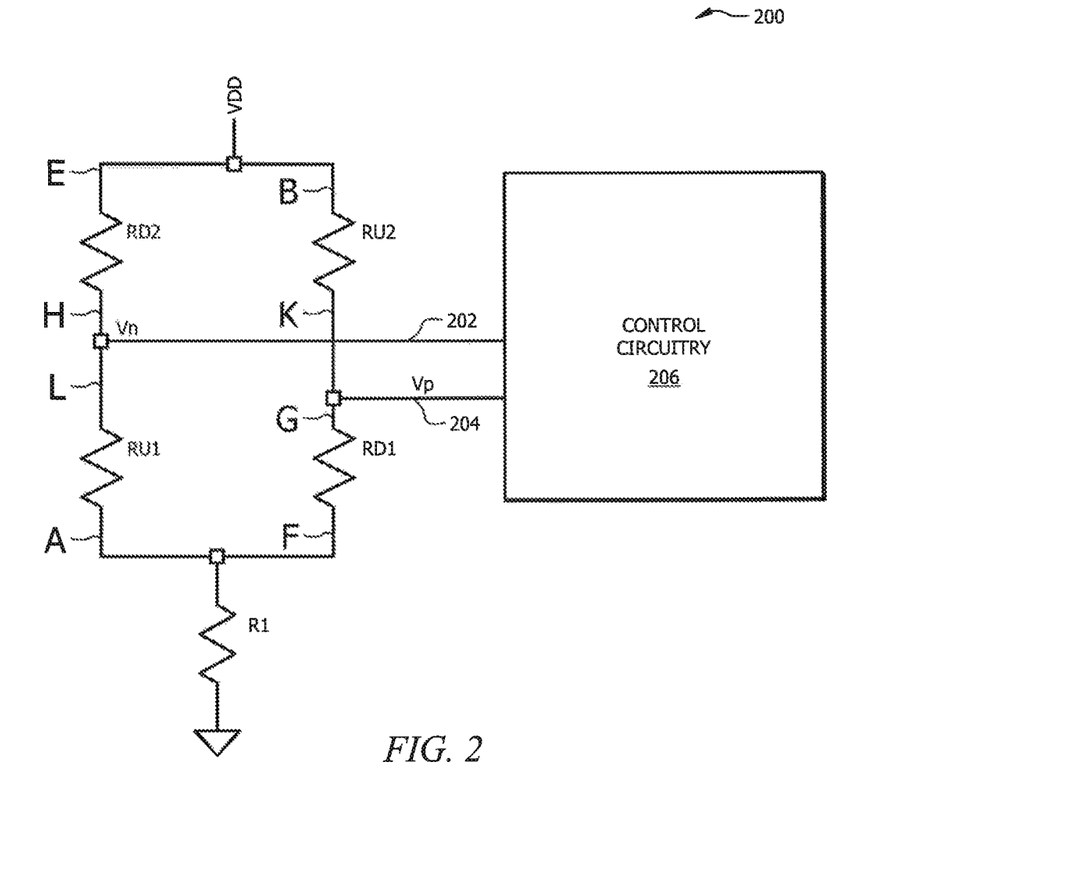
FIG. 2 is a schematic circuit diagram of an embodiment of a flow sensor with one or more self-heating resistive elements.
Figure 3:
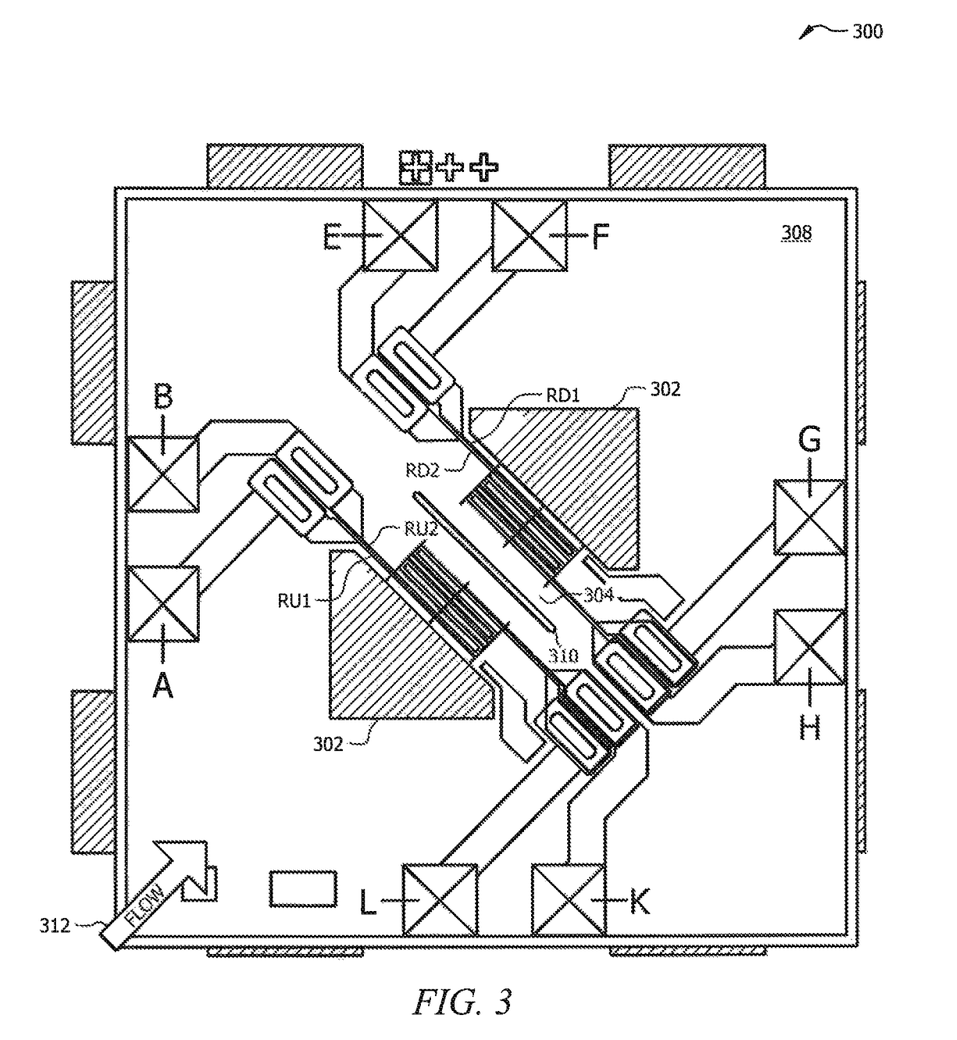
FIG. 3 is a top view of an embodiment of a flow sensor die.

FIG. 2 is a schematic circuit diagram of an illustrative flow sensor 200 without a dedicated heater. In the embodiment shown, the illustrative flow sensor 200 includes two upstream resistive elements RU1 and RU2 and two downstream resistive elements RD1 and RD2 connected in a full Wheatstone bridge configuration. It is contemplated, however, that only one upstream resistive element RU1 and one downstream resistive element RD2 may be provided, which in some cases, can be connected in a half-bridge or other configuration. In the example shown in FIG. 2, the two upstream resistive elements RU1 and RU2 can be positioned upstream of the two downstream resistive elements RD1 and RD2 within a flow channel, as best shown in FIG. 3. RU1 is connected between nodes L and A, RU2 is connected between nodes B and K, RD1 is connected between nodes C and F, and RD2 is connected between nodes E and H. A differential output of the bridge can be taken between nodes Vn 202 and Vp 204. During use, a supply voltage VDD (e.g., about 2.4 volts), may be provided to nodes E and B, and a reference voltage (e.g., ground or another reference voltage) may be connected to nodes A and F, either directly or through a resistor R1.

Control circuitry 206 can be used to control power to the bridge and can include, but is not limited to, various components such as a power circuit, a sensing circuit, a clock, communication components, and the like. The control circuitry 206 can be used to provide the supply voltage VDD and reference voltage to the sensor 200. The control circuitry 206 can also be in signal communication with the nodes Vn 202 and Vp 204 to receive the output signals from the resistive elements RU1, RU2, RD1, and RD2 to determine an output signal. The control circuitry 206 can also comprise a controller that is configured to control the supply of power to the sensor 200 along with other functions as described in more detail herein.

As shown in FIG. 2, the control circuitry 206 having a bridge power circuit, a sensing circuit, and the like can be a single unit. In some embodiments, the various components can be contained in separate circuits, and the various circuits can be in signal communication to collectively form the control circuitry.

In some embodiments, the resistive elements RU1, RU2, RD1, and RD2 can have substantially the same temperature coefficient of resistance (positive or negative). Substantially the same here means plus or minus ten (10) percent. In some cases, the resistive elements RU1, RU2, RD1, and RD2 can have temperature coefficients of resistance that are within 1 percent or less of each other. Also, the resistive elements RU1, RU2, RD1 and RD2 may have substantially the same nominal resistance, such as about 500 ohms. In some cases, resistive elements RU1, RU2, RD1, and RD2 may have nominal resistance valves that are within twenty (20) percent, ten (10) percent, five (5) percent, one (1) percent, or less of each other. In some cases, the resistive elements RU1, RU2, RD1, and RD2 may be formed from a common set of one or more layers. Notably, in FIG. 3, the two upstream resistive elements RU1 and RU2 and the two downstream resistive elements RD1 and RD2 are not separated by an intervening heater resistor, and in particular, a heater resistor that has a significantly lower resistance than the resistance of the resistive elements. Significantly less means at least twenty (20) percent less.

In order to provide the necessary heat to make the flow measurement, it is contemplated that one or more of the resistive elements RU1, RU2, RD1, and/or RD2 may be self-heating. That is, one or more resistive elements RU1, RU2, RD1, and/or RD2 may not only heat the fluid but also sense the temperature of the fluid. In an embodiment, all of the resistive elements RU1, RU2, RD1, and RD2 are self-heating (e.g., heat and sense). In some embodiments, only one upstream resistive element RU1 or RU2 may be self-heating, both upstream resistive elements RU1 and RU2 may be self-heating, only one upstream resistive element RU1 or RU2 and only one downstream resistive element RD1 or RD2 may be self-heating, or any other combination of resistive elements may be self-heating so long as at least one upstream resistive element is self-heating. In some cases, only one upstream resistive element and only one downstream resistive element may be provided, rather than two. In some embodiments, it is desirable to heat the one or more resistive elements that are being heated above the ambient temperature of the fluid in the flow channel to increase the signal-to-noise ratio of the flow sensor.

For discussion purposes, it is assumed that all of the resistive elements RU1, RU2, RD1, and RD2 are self-heating. During a measurement cycle when no flow is present, the resistive elements RU1, RU2, RD1, and RD2 heat the fluid in the flow channel, which through conduction and convection, evenly heats the resistive elements RU1, RU2, RD1, and RD2. Since all of the resistive elements RU1, RU2, RD1, and RD2 are heated evenly, the bridge circuit remains in balance and no differential output signal between Vp 204 and Vn 202 is developed (e.g., the differential output may be substantially zero).

When flow is present, the upstream resistive elements RU1 and RU2 are lowered in temperature relative to the downstream resistive elements RD1 and RD2. As the flow rate of the fluid in the flow channel increases, the difference in temperature between the upstream resistive elements RU1 and RU2 and the downstream resistive elements RD1 and RD2 increases. This difference in temperature causes the downstream resistive elements RD1 and RD2 to have a higher resistance than the upstream resistive elements RU1 and RU2 (assuming a positive temperature coefficient), thereby causing the bridge to become imbalanced. This imbalance produces a differential output signal between Vp 204 and Vn 202 that increases with flow rate and is monotonic with flow rate. When flow in the opposite direction is present, the roles of the upstream resistive elements RU1 and RU2 and the downstream resistive elements RD1 and RD2 may be reversed so that the temperature difference is reversed and the differential output signal between Vp 204 and Vn 202 has an opposite sign.

While various control circuitry 206 can be used, in some aspects, the control circuitry 206 may include a microprocessor, a microcontroller, an application specific integrated circuit ("ASIC"), and/or an application specific standard product ("ASSP"). As shown, the control circuitry 206 may be electrically connected to resistive elements in the bridge. For example, a control circuitry 206 may receive Vp 204 and Vn 202. The control circuitry 206 may condition the output signal from the bridge to correct for repeatable variations, such as offset, sensitivity, non-linearity, temperature effects, and/or other variations, and/or amplify (e.g., convert the output signal from a millivolt output to a voltage output), or convert the output signal (e.g., analog to digital conversions, etc.). In some embodiments, the control circuitry 206 can comprise a digital to analog converter (DAC) to provide a digital output from the force sensor 200. A fluid flow rate can then be determined from a correlation, through the use of calibration tables, or the like.

FIG. 3 is a top view of an embodiment of a flow sensor die 300. The illustrative flow sensor die 300 can have an etched cavity 302 that extends under a membrane 304. The etched cavity 302 can be used to thermally isolate the membrane 304 from the substrate 308 of the flow sensor die 300. The illustrative flow sensor die 300 includes a slit 310 that extends transverse across the membrane 304, but this is not required. During use, the illustrative flow sensor die 300 can be positioned in a flow channel (e.g., flow channel 104 of FIG. 1).

To help explain the operation of the flow sensor die 300, it is assumed that fluid flows over the flow sensor die 300 in the direction indicated by arrow 312. When so provided, the two upstream resistive elements RU1 and RU2 can be positioned on the membrane 304 upstream of the optional slit 310, and the two downstream resistive elements RD1 and RD2 can be positioned on the membrane 304 downstream of the slit 310. The illustrative flow sensor die 300 shown in FIG. 3 is one possible layout of the schematic circuit diagram shown in FIG. 2, with the corresponding nodes indicated (A-B, E-H and K-L). The illustrative flow sensor die 300 also does not include heater control circuitry.

Figure 4:
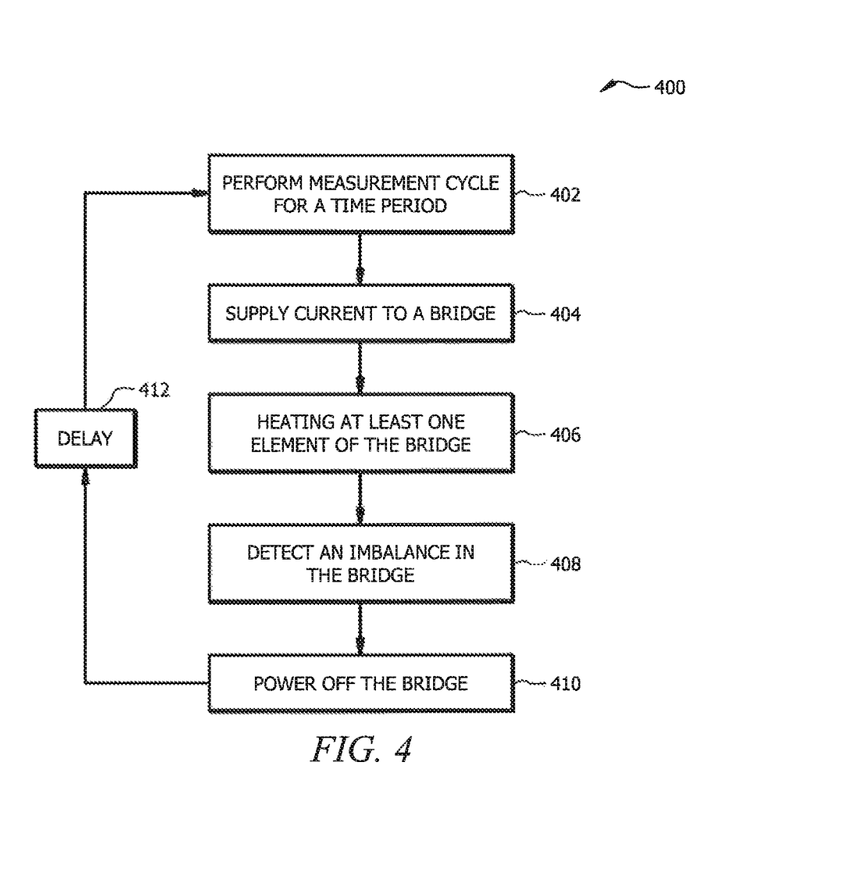
FIG. 4 is a flowchart of a method of sensing of a flow using a self-heating flow sensor.

Referring to FIGS. 3 and 4, sensing of the flow can be performed while the bridge is powered and one or more of the resistive elements are being heated and providing a thermal transient. In general, the resistive elements can be heated concurrently with the sensing so that the output voltage from the bridge can be measured while the supply voltage is sufficient to heat at least one upstream resistive element and at least one downstream resistive element. During the measurement cycle, the supply voltage VDD can be turned on to provide current to the resistive elements, and the resistive elements may begin to heat and eventually reach a thermal equilibrium state at which the temperature of the heated resistive elements is substantially constant at a given fluid flowrate. The measurement from the sensor can be taken during the heating (e.g., during a thermal transient) and/or at or after a thermal equilibrium is reached.

In general, the time over which a measurement is made can affect the accuracy of the measurement, where longer measurements tend to produce more accurate results. Further, measurements made at a thermal equilibrium state tend to produce more accurate results than those made during a transient heating state, but a greater amount of power is needed to first reach the thermal equilibrium and perform the measurements. The time during which the sensor is powered to make the measurement can then be based on a desired accuracy as well as a time needed to achieve a thermal equilibrium for the heater. For example, some applications may require a relatively accurate measurement of the flow rate, while other applications may only need to verify the presence of a flow and/or a flow rate relative to a threshold where the actual value is less important.

In order to reduce power consumption, the sensor as described herein may be operated in cycles comprising at least a powered on and sensing portion and a powered off or resting portion. In some embodiments, the sensor may be powered on and operated as described above. For example, power can be supplied to the sensor, and one or more upstream resistive element RU1, RU2, and one or more downstream resistive element RD1, RD2, can generate heat in response to being powered on. A sensor measurement can be made once the sensor is powered on. For example, one or more measurements can be made while the resistive elements heat to an equilibrium state during a thermal transient and/or one or more measurements can be made once the resistive elements have been heated to a thermal equilibrium state.

The relative ratio of the time the sensor is powered on to the time during which the sensor is powered off can vary depending on the amount of power available. In some embodiments, a ratio of the time the sensor is powered off to the time the sensor is powered on can be greater than about 1:10, greater than 1:5, greater than 1:2, greater than 1:1, greater than 5:1, or greater than 10:1. In some embodiments, the ratio of the time the sensor is powered off to the time the sensor is powered on can be less than about 10,000:1 or less than about 1,000:1. The relative time periods can be periodic, aperiodic, performed on a schedule, or provided on any other basis. In some embodiments, the sensor may only be powered on in response to an external event or cycled during a period determined by an external event. For example, use of the sensor having a cyclic power cycle may only be used in response to a blower being turned on to verify the presence of a flow.

The signal used to provide the power can also vary. In some embodiments, the power (e.g., as characterized by voltage, current, etc.) can be supplied as a square wave, a sine wave, or any other suitable waveform. When a square wave is used, a voltage can be supplied across the sensor bridge to allow one or more of the resistive elements to heat and provide a measurement as described above. The voltage across the bridge can then be set to zero to avoid current drain by the bridge. Alternatively, a sine wave or other smooth waveform can be used. In this application, the resistive elements may only self-heat upon the application of a sufficient voltage across the bridge, though a differential voltage may be detected across the application of a voltage across the bridge. This may allow the sensing circuitry to detect a voltage differential across the bridge before, during, and/or after one or more of the resistive elements self-heat. For example, a differential resistance can be detected across the bridge as the applied power drops below a heating threshold.

In order to operate in a cyclic fashion, the sensing circuitry can be configured to perform the cyclic application of power to the one or more resistive elements, which can be arranged in a full or half Wheatstone bridge. For example, the bridge can include at least one upstream resistive element and at least one downstream resistive element. The at least one upstream resistive element can have a first temperature coefficient of resistance, and the at least one downstream resistive element can have a second temperature coefficient of resistance. In some embodiments, the first temperature coefficient of resistance is substantially the same as the second temperature coefficient of resistance, though some differences in the temperature coefficients of resistance can be used as described in more detail herein. While the power to the one or more resistive elements can be operated between powered on and powered off states, the power to the sensing circuitry can be continuously operated to provide control functions, communication functions, and the like.

The control circuitry can be configured to periodically provide the power to the one or more resistive elements in the bridge to perform a measurement cycle, and then power off the bridge between each measurement cycle. For each measurement cycle, the control circuit ca be configured to supply a current to the bridge, which can result in the upstream resistive element(s) and the downstream resistive element(s) resistively heating to a temperature above an ambient temperature of the fluid being measured. The control circuitry can be configured to detect an imbalance across the bridge resulting from a temperature difference between the upstream resistive element(s) and the downstream resistive element(s) in response to a flow of a fluid past the bridge, where the imbalance can be related to a rate of the fluid flow past the bridge. The control circuitry can detect the imbalance across the bridge before or during the heating (e.g., during a thermal transient) and/or after a thermal equilibrium is obtained.

Once a measurement cycle has occurred, the control circuitry can be configured to shut power off to the bridge and the one or more resistive elements. This may reduce power consumption overall for the sensor. A subsequent measurement cycle can then be performed. The amount of time that the bridge is powered on relative to the amount of time the bridge is powered off can vary according to any of the values described herein.

FIG. 4 illustrates a method 400 of sensing flow using the sensors described herein. At step 402, a measurement cycle can be performed for a time period. The time period can be determined according to a use of the flow sensor, and in some embodiments, can be set by the control circuitry. During the measurement cycle, a current can be supplied to a flow sensor at step 404. As described in more detail above, the flow sensor can comprise at least one upstream resistive element and at least one downstream resistive element arranged in a bridge. The supply of current to the sensor can be, for example, supplied to one or more resistive elements of the flow sensor by control circuitry that can be internal or external to the sensor. The power supplied in step 404 can be provided from any suitable source such as a power supply and/or a battery.

In general, the one or more resistive elements are self-heating elements, and the flow sensor may not comprise a separate heater resistor or element or any heater control circuitry for a separate heater element outside of the resistive elements arranged in the bridge for sensing. In an embodiment, the resistive elements can comprise two upstream resistive elements, and the downstream resistive elements can comprise two downstream resistive elements. The four resistive elements can be arranged in a full Wheatstone bridge configuration. The various resistive elements can include any of the elements and/or properties as described herein.

In some embodiments, supplying the current to the flow sensor can comprise pulsing power to a flow sensor. The pulsed power can have a waveform such as a square wave or a sine wave. The period during which the power is pulsed on can be used to perform the measurement cycle, and at least a portion of the power pulse can include a zero voltage state across the resistive elements.

At step 406, the at least one upstream resistive element and the at least one downstream resistive element can be resistively heated to a temperature above an ambient temperature in response to supplying the current to the sensor. At step 408, an imbalance in the bridge resulting from a temperature difference between the at least one upstream resistive element and the at least one downstream resistive element can be detected in response to the flow of a fluid past the flow sensor. The imbalance can be related and/or correlated to a rate of the fluid flow (e.g., a flowrate, a mass flow rate, etc.) past the flow sensor. In some embodiments, the imbalance can be detected during a thermal transient and/or once a thermal equilibrium has been reached while resistively heating at least one upstream resistive element and the at least one downstream resistive element.

After the flow measurement has been obtained and the measurement cycle is complete, the flow sensor can be powered off for a period of time at step 410. During the powered off state, no current flows to the resistive elements, though power can still be used by the control circuitry. The sensor, or at least the resistive elements, can remain powered off for the period of time as indicated by the delay 412 in FIG. 4. In some embodiments, the entire sensor may enter a sleep state for a delay period to further conserve power. An internal clock can be used to reawaken the control circuitry after the delay in step 412 to further execute another measurement cycle. In some embodiments, a ratio of the amount of time the sensor is powered off (e.g., the amount of time the resistive elements are not being powered) to an amount of time the resistive elements are powered on can be within any of the ranges described herein.

In some embodiments, the method 400 can then repeat with the performance of another measurement cycle in step 402. The amount of time each measurement cycle is performed can be the same or vary between cycles. For example, each cycle can be performed for the same time period. In some instances in which the flow rate is not changing, subsequent measurement cycles can be shortened to reduce the accuracy to verify a flow rate within a threshold of the previous measurement cycle. Any deviation from a prior flow rate by more than a threshold may then be used to provide a longer measurement cycle. In some embodiments, the control circuitry can be used to control the measurement cycle time period for each measurement cycle.

Having described various devices and methods, various embodiments can include, but are not limited to:

In a first embodiment, a method of sensing a flow comprises: performing a measurement cycle for a first period of time, wherein performing the measurement cycle comprises: supplying a current to a flow sensor, wherein the flow sensor comprises at least one upstream resistive element and at least one downstream resistive element arranged in a bridge; resistively heating the at least one upstream resistive element and the at least one downstream resistive element to a temperature above an ambient temperature in response to supplying the current to the sensor; detecting an imbalance in the bridge resulting from a temperature difference between the at least one upstream resistive element and the at least one downstream resistive element in response to the flow of a fluid past the flow sensor, wherein the imbalance is related to a rate of the fluid flow past the flow sensor; powering off the at least one upstream resistive element and the at least one downstream resistive element for a second period of time, wherein no current flows to the at least one upstream resistive element and the at least one downstream resistive element during the second period of time; and performing the measurement cycle for a third period of time.

A second embodiment can include the method of the first embodiment, wherein a ratio of the second period of time to the first period of time is between about 1:2 to about 1000:1.

A third embodiment can include the method of the first or second embodiment, wherein the flow sensor does not comprise a separate heater resistor.

A fourth embodiment can include the method of any of the first to third embodiments, wherein the at least one upstream resistive element comprises a first upstream resistive element and a second upstream resistive element, wherein the at least one downstream resistive element comprises a first downstream resistive element and a second downstream resistive element, and wherein the first upstream resistive element, the second upstream resistive element, the first downstream resistive element, and the second downstream resistive element are arranged in a full Wheatstone bridge configuration.

A fifth embodiment can include the method of any of the first to fourth embodiments, wherein the at least one upstream resistive element has a first temperature coefficient of resistance, wherein the at least one downstream resistive element has a second temperature coefficient of resistance, and wherein the first temperature coefficient of resistance is substantially the same as the second temperature coefficient of resistance.

A sixth embodiment can include the method of any of the first to fifth embodiments, wherein the at least one upstream resistive element has a first nominal resistance, wherein the at least one downstream resistive element has a second nominal resistance, and wherein the first nominal resistance is substantially the same as the second nominal resistance.

A seventh embodiment can include the method of any of the first to sixth embodiments, wherein detecting the imbalance comprises detecting the imbalance during a thermal transient while resistively heating at least one upstream resistive element and the at least one downstream resistive element.

An eighth embodiment can include the method of any of the first to seventh embodiments, wherein detecting the imbalance comprises detecting the imbalance after a thermal equilibrium is achieved while resistively heating the at least one upstream resistive element and the at least one downstream resistive element.

A ninth embodiment can include the method of any of the first to eighth embodiments, wherein supplying a current to the flow sensor comprises pulsing power to a flow sensor, wherein the pulsed power has a waveform, and wherein the waveform comprises a square wave or a sine wave.

A tenth embodiment can include the method of any of the first to ninth embodiments, wherein supplying the current comprises supplying the current from a battery.

In an eleventh embodiment, a flow sensor comprises: at least one upstream resistive element; at least one downstream resistive element, wherein the at least one upstream resistive element and the at least one downstream resistive element are arranged in a bridge; control circuitry in signal communication with the bridge, wherein the control circuitry is configured to: periodically provide power to the bridge to perform measurement cycles; and power off the bridge between each measurement cycle, wherein, during each measurement cycle, the control circuitry is configured to: supply a current to the bridge; resistively heat the at least one upstream resistive element and the at least one downstream resistive element to a temperature above an ambient temperature in response to the current; and detect an imbalance in the bridge resulting from a temperature difference between the at least one upstream resistive element and the at least one downstream resistive element in response to a flow of a fluid past the bridge, wherein the imbalance is related to a rate of the fluid flow past the bridge.

A twelfth embodiment can include the flow sensor of the eleventh embodiment, wherein the control circuitry is configured to provide power to the bridge for a first time period and power off the bridge for a second time period, wherein a ratio of the second period of time to the first period of time is between about 1:2 to about 1000:1.

A thirteenth embodiment can include the flow sensor of the eleventh or twelfth embodiment, wherein the bridge comprises a full Wheatstone bridge.

A fourteenth embodiment can include the flow sensor of any of the eleventh to thirteenth embodiments, wherein the at least one upstream resistive element has a first temperature coefficient of resistance, wherein the at least one downstream resistive element has a second temperature coefficient of resistance, and wherein the first temperature coefficient of resistance is substantially the same as the second temperature coefficient of resistance.

A fifteenth embodiment can include the flow sensor of any of the eleventh to fourteenth embodiments, wherein the control circuitry is configured to detect the imbalance during a thermal transient, after the bridge achieves a thermal equilibrium, or both.

In a sixteenth embodiment, a method of sensing a flow comprises: pulsing power to a flow sensor, wherein the flow sensor comprises at least one upstream resistive element and at least one downstream resistive element arranged in a bridge; resistively heating the at least one upstream resistive element and the at least one downstream resistive element to a temperature above an ambient temperature in response to pulsing the power; and detecting an imbalance in the bridge resulting from a temperature difference between the at least one upstream resistive element and the at least one downstream resistive element in response to the flow of a fluid past the flow sensor, wherein the imbalance is related to a rate of the fluid flow past the flow sensor.

A seventeenth embodiment can include the method of the sixteenth embodiment, wherein pulsing the power comprises supplying power to the bridge for at least a first portion of a time period and powering off the bridge for at least a second portion of the time period.

An eighteenth embodiment can include the method of the sixteenth or seventeenth embodiment, wherein pulsing the power to the flow sensor comprises providing current to the bridge having a waveform, wherein the waveform comprises a square wave or a sine wave.

A nineteenth embodiment can include the method of any of the sixteenth to eighteenth embodiments, wherein detecting the imbalance comprises detecting the imbalance during a thermal transient while resistively heating at least one upstream resistive element and the at least one downstream resistive element.

A twentieth embodiment can include the method of any of the sixteenth to nineteenth embodiments, wherein detecting the imbalance comprises detecting the imbalance after a thermal equilibrium is achieved while resistively heating the at least one upstream resistive element and the at least one downstream resistive element.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of sensing a flow, the method comprising:
   performing a measurement cycle for a first period of time, wherein performing the measurement cycle comprises:
   supplying an elevated current that is above a heating current threshold to a flow sensor, wherein the flow sensor comprises control circuitry, at least one upstream resistive element, and at least one downstream resistive element arranged in a bridge;

resistively heating the at least one upstream resistive element and the at least one downstream resistive element to a temperature above an ambient temperature in response to supplying the elevated current to the flow sensor;

reducing the elevated current to the flow sensor to below the heating current threshold and detecting an imbalance in the bridge resulting from a temperature difference between the at least one upstream resistive element and the at least one downstream resistive element as a result of the flow of a fluid past the flow sensor, wherein the imbalance is related to a sensed rate of the fluid flow past the flow sensor;

powering down the at least one upstream resistive element and the at least one downstream resistive element for a second period of time before performing a subsequent measurement cycle; and adjusting a duration of the subsequent measurement cycle based on the sensed rate of the fluid flow past the flow sensor.

2. The method of claim 1, wherein a ratio of the second period of time to the first period of time is between about 1:2 to about 1000:1.

3. The method of claim 1, wherein the flow sensor does not comprise a separate heater resistor.

4. The method of claim 1, wherein the at least one upstream resistive element comprises a first upstream resistive element and a second upstream resistive element, wherein the at least one downstream resistive element comprises a first downstream resistive element and a second downstream resistive element, and wherein the first upstream resistive element, the second upstream resistive element, the first downstream resistive element, and the second downstream resistive element are arranged in a full Wheatstone bridge configuration.

5. The method of claim 1, wherein the at least one upstream resistive element has a first temperature coefficient of resistance, wherein the at least one downstream resistive element has a second temperature coefficient of resistance, and wherein the first temperature coefficient of resistance is substantially the same as the second temperature coefficient of resistance.

6. The method of claim 1, wherein a voltage across the at least one upstream resistive element and the at least one downstream resistive element reaches or goes beyond a heating voltage threshold value when the elevated current above the heating current threshold is applied to the flow sensor, and wherein the voltage across the at least one upstream resistive element and the at least one downstream resistive element is below the heating voltage threshold value when the elevated current is reduced to below the heating current threshold, wherein the detecting the imbalance in the bridge occurs when the voltage across the at least one upstream resistive element and the at least one downstream resistive element is below the heating voltage threshold value.

7. The method of claim 1, wherein the elevated current above the heating current threshold is supplied in a pulse.

8. The method of claim 1, wherein detecting the imbalance comprises detecting the imbalance after a thermal equilibrium is achieved while resistively heating the at least one upstream resistive element and the at least one downstream resistive element.

9. The method of claim 1, wherein supplying the elevated current that is above the heating current threshold to the flow sensor comprises pulsing power to the flow sensor, wherein the pulsed power has a waveform, and wherein the waveform comprises a square wave or a sine wave.

10. The method of claim 1, wherein performing the measurement cycle with the flow sensor is in response to initiation of an event and supplying the current comprises supplying the current from a battery.

11. A flow sensor comprising:
at least one upstream resistive element;
at least one downstream resistive element, wherein the at least one upstream resistive element and the at least one downstream resistive element are arranged in a bridge;
control circuitry in signal communication with the bridge, wherein while receiving power the control circuitry is configured to:
periodically provide power to the bridge for a measurement period to perform a measurement cycle; and
enter the bridge into a heating and measuring delay period by powering down the bridge between each measurement cycle,
wherein, during each measurement cycle, the control circuitry is configured to:
supply an elevated current that is above a heating current threshold to the bridge;
resistively heat the at least one upstream resistive element and the at least one downstream resistive element to a temperature above an ambient temperature in response to the elevated current; and
stop supplying the elevated current to the bridge; and
supply a sense current that is below the heating current threshold to the bridge, and while supplying the sense current, detect an imbalance in the bridge resulting from a temperature difference between the at least one upstream resistive element and the at least one downstream resistive element in response to a flow of a fluid past the bridge, wherein the imbalance is related to a rate of the fluid flow past the bridge.

12. The flow sensor of claim 11, wherein a ratio of the heating and measuring delay period to the measurement period is between about 1:2 to about 1000:1.

13. The flow sensor of claim 11, wherein the bridge comprises a full Wheatstone bridge.

14. The flow sensor of claim 11, wherein the at least one upstream resistive element has a first temperature coefficient of resistance, wherein the at least one downstream resistive element has a second temperature coefficient of resistance, and wherein the first temperature coefficient of resistance is substantially the same as the second temperature coefficient of resistance.

15. The flow sensor of claim 11, wherein the control circuitry is configured to detect the imbalance after the bridge achieves a thermal equilibrium.

16. A method of sensing a flow, the method comprising:
pulsing power to at least one upstream resistive element and at least one downstream resistive element arranged in a bridge of a flow sensor, wherein the flow sensor comprises control circuitry receiving power during pulses of power to the at least one upstream resistive element and the at least one downstream resistive element and during a heating delay period between pulses of power to the at least one upstream resistive element and the at least one downstream resistive element;
resistively heating the at least one upstream resistive element and the at least one downstream resistive element to a temperature above an ambient temperature in response to pulsing an elevated the power Off that is above a heating power threshold for a heating period;

stop supplying the elevated power to the bridge after the heating period; and supplying a sense power that is below the heating power threshold to the bridge, and while supplying the sense power to the bridge, detecting an imbalance in the bridge resulting from a temperature difference between the at least one upstream resistive element and the at least one downstream resistive element in response to the flow of a fluid past the flow sensor, wherein the imbalance is related to a sensed rate of the fluid flow past the flow sensor; and adjusting a duration of a subsequent heating period based on the sensed rate of the fluid flow past the flow sensor.

17. The method of claim 16, wherein pulsing the power comprises supplying the elevated power to the bridge for the heating period and powering off the bridge for the heating delay period.

18. The method of claim 16, wherein pulsing the power to the flow sensor comprises providing current to the bridge having a waveform, wherein the waveform comprises a square wave or a sine wave.

19. The method of claim 16, wherein detecting the imbalance comprises detecting the imbalance during a thermal transient in the at least one upstream resistive element and the at least one downstream resistive element.

20. The method of claim 16, wherein detecting the imbalance comprises detecting the imbalance after a thermal equilibrium is achieved while resistively heating the at least one upstream resistive element and the at least one downstream resistive element.

* * * * *